United States Patent
King

(10) Patent No.: US 10,827,737 B2
(45) Date of Patent: Nov. 10, 2020

(54) FLYING INSECT CATCHING APPARATUS

(71) Applicant: Rebecca King, Covington, TN (US)

(72) Inventor: Rebecca King, Covington, TN (US)

( * ) Notice: Subject to any disclaimer, the term of this patent is extended or adjusted under 35 U.S.C. 154(b) by 451 days.

(21) Appl. No.: 15/626,214

(22) Filed: Jun. 19, 2017

(65) Prior Publication Data

US 2018/0360018 A1 Dec. 20, 2018

(51) Int. Cl.
*A01M 1/04* (2006.01)
*A01M 1/10* (2006.01)

(52) U.S. Cl.
CPC .............. *A01M 1/04* (2013.01); *A01M 1/106* (2013.01)

(58) Field of Classification Search
CPC ............ A01M 1/00; A01M 1/02; A01M 1/04; A01M 1/10; A01M 1/106; A01M 1/14
USPC ...... 43/107, 113, 114, 122, 132.1, 133, 296, 43/200; D22/119
See application file for complete search history.

(56) References Cited

U.S. PATENT DOCUMENTS

| | | | | |
|---|---|---|---|---|
| 744,866 A * | 11/1903 | Katzke | ............... | A01M 1/14 43/115 |
| 1,366,059 A * | 1/1921 | Miller | ............... | A01M 1/106 43/118 |
| 1,666,509 A * | 4/1928 | Schlossareck | ............... | A01M 1/04 362/101 |
| 2,029,989 A * | 2/1936 | Driggers | ............... | A01M 1/02 43/122 |
| 2,046,430 A * | 7/1936 | Rutherford | ............... | A01M 1/103 43/107 |
| 4,121,372 A * | 10/1978 | Landaus | ............... | A01M 1/106 43/122 |
| 5,339,563 A * | 8/1994 | Job | ............... | A01M 1/00 43/107 |
| D358,629 S * | 5/1995 | Wefler | ............... | D22/119 |
| 5,490,349 A * | 2/1996 | Muramatsu | ............... | A01M 1/02 43/121 |
| 5,836,104 A | 11/1998 | Epps | | |
| 5,842,305 A * | 12/1998 | Liao | ............... | A01M 1/02 43/122 |
| 6,604,317 B1 | 8/2003 | Newman | | |
| 8,056,282 B2 | 11/2011 | Schneider | | |
| 8,205,378 B2 | 6/2012 | Banfield | | |
| 8,220,197 B1 | 7/2012 | Pray | | |
| 8,356,444 B2 | 1/2013 | Pazik et al. | | |
| 8,448,376 B2 * | 5/2013 | Kagawa | ............... | A01M 1/106 43/107 |
| 8,484,887 B2 | 7/2013 | Schneidmiller et al. | | |
| 8,677,678 B2 | 3/2014 | Schneidmiller et al. | | |
| 8,959,830 B2 | 2/2015 | McGavin | | |
| 2006/0162235 A1* | 7/2006 | Shih | ............... | A01M 1/023 43/107 |
| 2006/0236592 A1* | 10/2006 | Hall, Jr. | ............... | A01M 1/106 43/122 |
| 2011/0283599 A1* | 11/2011 | Wu | ............... | A01M 1/106 43/113 |
| 2014/0165452 A1* | 6/2014 | Rocha | ............... | A01M 1/08 43/113 |

(Continued)

*Primary Examiner* — Christopher D Hutchens
(74) *Attorney, Agent, or Firm* — David J. Kreher

(57) ABSTRACT

An apparatus for trapping flying insects including a plurality of shields suspended over a dark colored catch basin, which is attached to a dark colored base so that the dark colors attract the flying insects, which then collide with the shield and are knocked into the basin, which contains a liquid capable of trapping the flying insects.

4 Claims, 3 Drawing Sheets

(56) References Cited

U.S. PATENT DOCUMENTS

2015/0173340 A1   6/2015  Bernhardt
2016/0345569 A1* 12/2016  Freudenberg ........... A01M 1/04
2017/0006851 A1*  1/2017  Doman ................. A01M 1/106

* cited by examiner

FIG. 3

| Day | Date | Godfather | Dirty Harry | Vampire Slayer | Black Widow | Daily Total | Cumlative Total |
|---|---|---|---|---|---|---|---|
| 1 | 22-Aug | 24 | --- | --- | --- | 24 | 24 |
| 2 | 23-Aug | 90 | 54 | --- | --- | 144 | 168 |
| 3 | 24-Aug | 28 | 53 | 4 | --- | 85 | 253 |
| 4 | 25-Aug | 14 | 28 | 3 | --- | 45 | 298 |
| 5 | 26-Aug | 4 | 7 | 6 | --- | 17 | 315 |
| 6 | 27-Aug | 18 | 23 | 13 | --- | 54 | 369 |
| 7 | 28-Aug | 43 | 11 | 17 | --- | 71 | 440 |
| 8 | 29-Aug | 69 | 6 | 11 | --- | 86 | 526 |
| 9 | 30-Aug | 26 | 12 | 14 | 33 | 85 | 611 |
| 10 | 31-Aug | 21 | 11 | 17 | 69 | 118 | 729 |
| 11 | 1-Sep | 3 | 3 | 5 | 28 | 39 | 768 |
| 12 | 2-Sep | 3 | 6 | 5 | 27 | 41 | 809 |
| 13 | 3-Sep | 5 | 2 | 5 | 28 | 40 | 849 |
| 14 | 4-Sep | 15 | 7 | 5 | 42 | 69 | 918 |
| 15 | 5-Sep | 2 | 15 | 5 | 29 | 51 | 969 |
| 16 | 6-Sep | 11 | 3 | --- | 41 | 55 | 1024 |
| 17 | 7-Sep | 15 | 1 | --- | 23 | 39 | 1063 |
| 18 | 8-Sep | 26 | | | 26 | 52 | 1115 |
| 19 | 9-Sep | 40 | 3 | --- | 40 | 83 | 1198 |
| 20 | 10-Sep | 16 | 3 | --- | 18 | 37 | 1235 |
| 21 | 11-Sep | 12 | | --- | 6 | 18 | 1253 |
| 22 | 12-Sep | 49 | 4 | --- | 36 | 89 | 1342 |
| 23 | 13-Sep | 27 | 9 | --- | 40 | 76 | 1418 |
| 24 | 14-Sep | 34 | 3 | --- | 31 | 68 | 1486 |
| 25 | 15-Sep | 22 | 1 | --- | 21 | 44 | 1530 |
| 26 | 16-Sep | --- | --- | --- | --- | 0 | 1530 |
| 27 | 17-Sep | --- | --- | --- | --- | 0 | 1530 |
| 28 | 18-Sep | 59 | 2 | --- | 45 | 106 | 1636 |
| 29 | 19-Sep | --- | --- | --- | --- | 0 | 1636 |
| 30 | 20-Sep | --- | --- | --- | --- | 0 | 1636 |
| 31 | 21-Sep | 60 | 5 | --- | 20 | 85 | 1721 |
| 32 | 22-Sep | 22 | 2 | | 21 | 45 | 1766 |
| 33 | 23-Sep | --- | | | | 0 | 1766 |
| 34 | 24-Sep | 26 | --- | --- | 22 | 48 | 1814 |
| 35 | 25-Sep | 8 | --- | --- | --- | 8 | 1822 |
| 36 | 26-Sep | --- | --- | --- | --- | 0 | 1822 |
| 37 | 27-Sep | --- | --- | --- | --- | 0 | 1822 |
| 38 | 28-Sep | --- | --- | --- | --- | 0 | 1822 |
| 39 | 29-Sep | 11 | --- | --- | 10 | 21 | 1843 |
| Totals | | 803 | 274 | 110 | 656 | | |

FLYING INSECT CATCHING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

This disclosure relates to an apparatus for trapping and eliminating flying insects, including but not limited to horseflies. Specifically, animals such as horses, cows, sheep, goats and chickens are harassed by flying insects such as horse flies. These flying insects are predatory in that they bite the animals, damaging the animal through the removal of skin, extracting blood, depositing bacteria, larva or eggs, or other substances, causing allergic reactions, welts, pass on diseases, such as but not limited to pigeons' disease, and by exposing open wounds can draw other flying insects to the wound. These flying insects, are attracted to dark, glossy objects. The intent of the disclosure is to attract the flying insects with a large, dark glossy colored object and have a plurality of clear, transparent shields positioned so that when the flying insects circle its prey, fly into the shields the insects are knocked down into a catch basin that contains a liquid that prevents the flying insects from subsequently flying away.

Background of the Invention

Many attempts have been made to create an apparatus for capturing flying insects. Of particular relevance is Epps, U.S. Pat. No. 5,836,104, which discloses a collection of clear deflectors positioned over a catch basin, wherein the catch basin contains a liquid capable of trapping the flying insects, and where there are a collection of opaque targets positioned around the apparatus to attract the flying insects, whereas in the present disclosure basin and base are designed as the attracting means for the flying insects.

SUMMARY OF THE INVENTION

The present disclosure reveals an apparatus for catching flying insects with a plurality of clear transparent shields suspended at an angle over a dark, glossy colored base and catch basin such that, the flying insects are attracted to the dark glossy color of the base and catch basin and fly over the catch basin, whereupon, because each of the shields of the plurality of shields are clear and transparent, the flying insects cannot see any of the plurality of shields, collide with one of the shields of the plurality of shields, and fall into the catch basin. The catch basin contains a liquid capable of preventing the flying insects from escaping.

The base and catch basin are dark colored such as dark brown, dark blue, or black, with the preferred color being black, because flying insects are attracted to these dark colors more so than light colors. The base is enclosed so that the surface area of the sides of the base is maximized to maximize the attraction to the flying insects. The dark color is also preferred to be of a glossy finish as flying insects are more attracted to the glossy finish over a flat finish.

The inventor has conducted tests to determine the best angle at which to suspend the shields between 30 and 44 degrees and determined that the preferred angle for the shields is 38 degrees.

BRIEF DESCRIPTION OF THE SEVERAL VIEWS OF THE DRAWING

FIG. 3 is a table of the results of the number of flying insects caught based on the angle of the shields.

AMENDED DETAILED DESCRIPTION OF THE INVENTION

Figure 1:
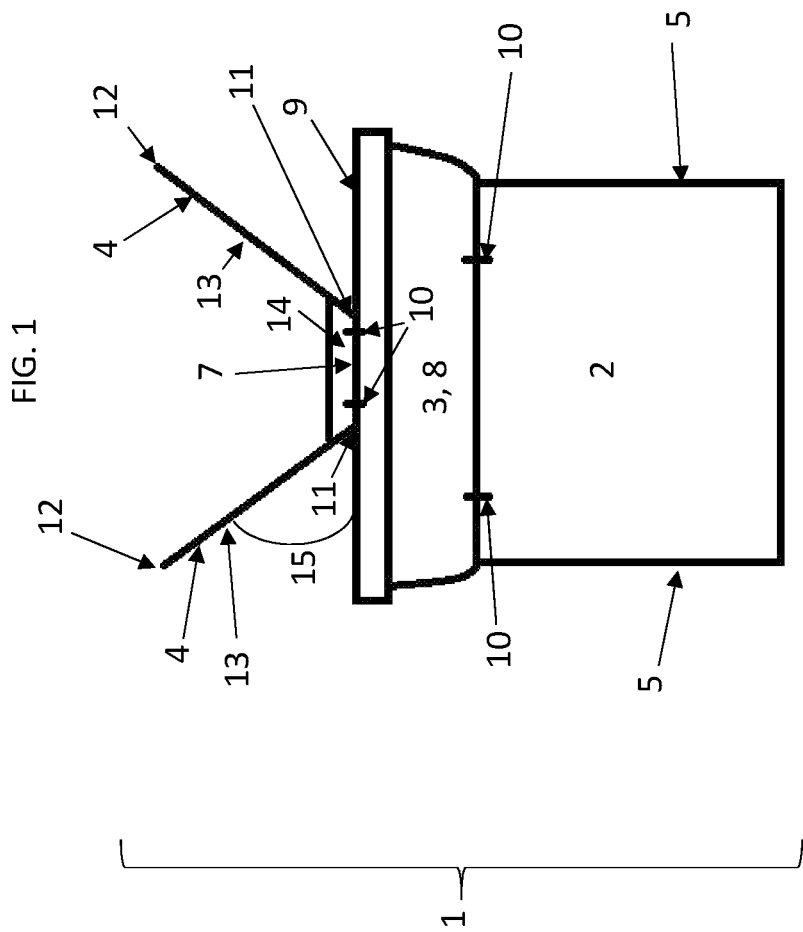
FIG. 1 is an end view of the apparatus for catching flying insects.
Figure 2:
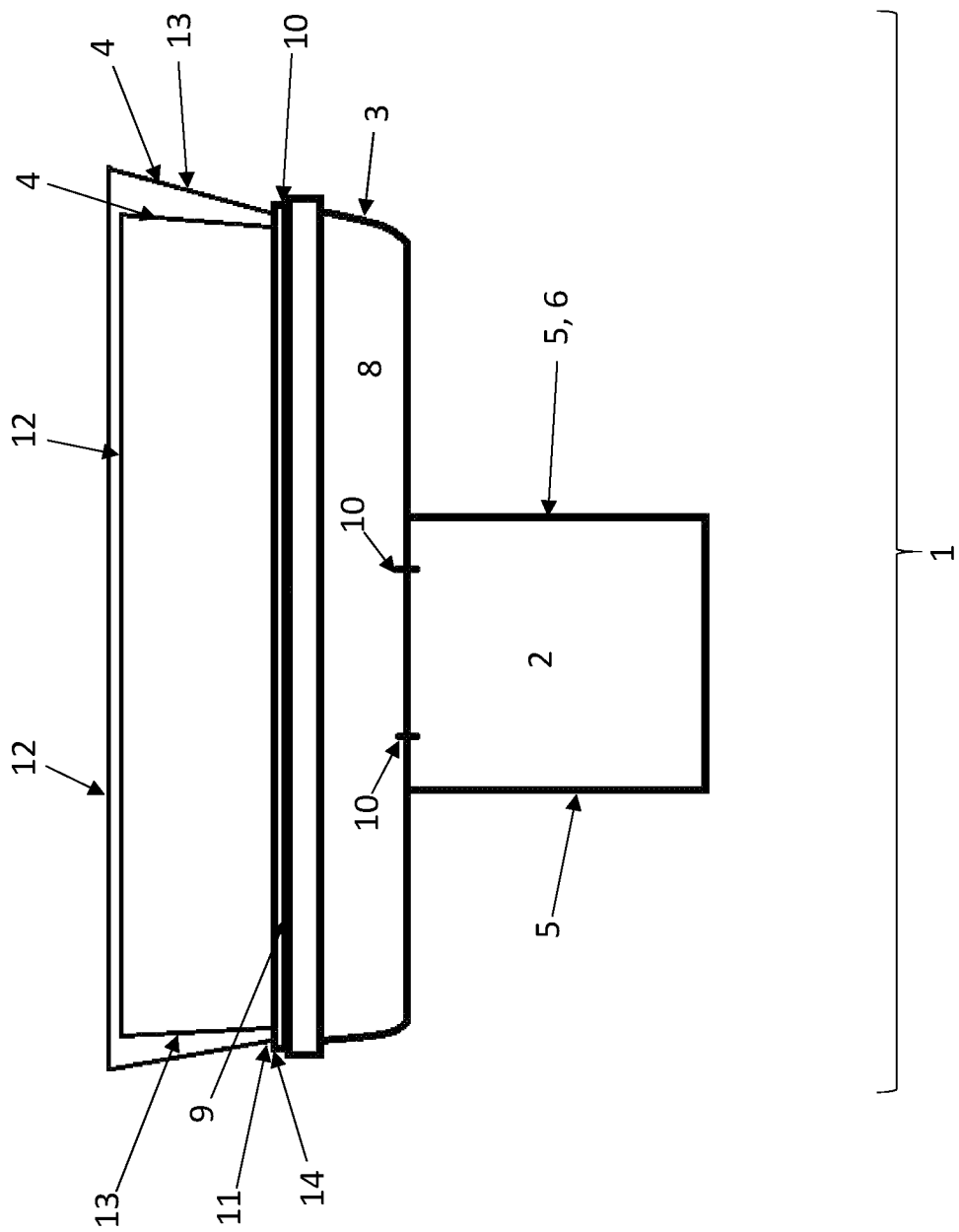
FIG. 2 is a side view of the apparatus for catching flying insects with a container as the base.

The present disclosure reveals an apparatus 1 for the catching of flying insects comprising a base 2, a catch basin 3, and a plurality of shields 4.

The base 2 is made up of a dark colored enclosure with a plurality of sides 5, said plurality of sides 5 to be defined as at least one side so as to allow for a cylindrical base. The dark color can be a color such as dark brown, dark blue, or black, with the preferred color being black and wherein the dark color is further preferred to have a glossy finish over a flat finish. The advantage of the dark color being that it attracts flying insects better than light colors. The glossy finish also being better at attracting flying insects than flat finishes. The advantage of the base 2 as an enclosure rather than individual legs is that enclosure maximizes the amount of dark colored surface area available to attract flying insects. The base 2 may further be a container 6 capable of holding material such as liquid or sand to stabilize the apparatus 1 against the weather, wherein said container 6 may be a barrel, drum, or crate.

The catch basin 3 is a dark colored basin, capable of holding liquid, and comprising a center 7 and a plurality of sides 8. the dark color can be a color such as dark brown, dark blue, or black, with the preferred color being black and wherein the dark color is preferred to have a glossy finish over a flat finish. The advantage of the dark color being that it attracts flying insects better than light colors. The glossy finish also being better at attracting flying insects than flat finishes.

The liquid 9 in the catch basin 3 is capable of preventing a flying insect from departing once the flying insect falls into the liquid, wherein the liquid may be a combination of water the dish soap or other surfactant.

The base 2 is attached to the catch basin 3 by a plurality of fasteners 10. Said plurality of fasteners 10 can be items common to the industry for this type of activity such as bolts, screws, or rivets.

The plurality of shields 4 are clear and transparent with each shield comprising a first edge 11, a second edge 12, and a plane 13 between the first edge 11 and the second edge 12. These plurality of shields 4 are suspended over the catch basin by a support structure 14 that is attached to the catch basin 3 by a plurality of fasteners 10 and wherein the support structure 14 holds the plurality of shields 4 in such a fashion so as to position the plurality of shields 4 over the catch basin 3 so that each shield 4 of the plurality of shields 4 is arranged with the first edge 11 in the area of the center 7 of the catch basin 3 and the second edge 12 positioned toward one of the sides 5 of the plurality of sides 5 and there is an angle 15 of the plane 13 of the shield 4 of each of the plurality of shields 4. The angle 15 of the plane 13 of each shield 4 of the plurality of shields 4 is angled from horizontal from the first edge 11, so that the first edge 11 positioned lower than the second edge 12 and the plane 13 between the first edge 11 and the second edge 12 traverses the angle 15 of the plane 13, and wherein the angle 15 of the plane from horizontal is between 30 and 44 degrees. The preferred angle of the plane is 38 degrees.

What is claimed:

1. An apparatus for catching flying insects consisting of: a base, a catch basin, and a plurality of shields;
   the base consisting of a dark colored enclosure and a plurality of sides;
   the catch basin being dark colored, capable of holding liquid, and consisting of a center and a plurality of sides;
   the base being attached to the catch basin by a plurality of fasteners;
   the plurality of shields being clear and transparent with each shield consisting of a first edge, a second edge, and a plane between the first edge and the second edge;
   the catch basin further consisting of a support structure for the plurality of shields said support structure being attached to the catch basin by a plurality of fasteners and that hold the plurality of shields in such a fashion so as to position the plurality of shields over the catch basin in such a fashion so that each shield of the plurality of shields is arranged with the first edge of each shield in the area of the center of the catch basin and the second edge positioned toward one of the plurality of sides of the catch basin and there is an angle of the plane of the shield of each of the plurality of shields; and
   wherein the angle of the plane of each shield of the plurality of shields is angled from horizontal from the first edge, so that the first edge positioned lower than the second edge and the plane between the first edge and the second edge traverses the angle of the plane, and wherein the angle of the plane from the horizontal is between 30 and 44 degrees.

2. The apparatus of claim 1 wherein the angle of the plane is 38 degrees.

3. The apparatus of claim 1 wherein the base is a container capable of holding material.

4. The apparatus of claim 3 wherein the angle of the plane is 38 degrees.

* * * * *